United States Patent [19]

Betterton et al.

[11] Patent Number: 4,630,480
[45] Date of Patent: Dec. 23, 1986

[54] TRANSDUCER FASTENING DEVICE

[75] Inventors: Joseph T. Betterton, Arab; Alfred H. Glover, Decatur, both of Ala.

[73] Assignee: Chrysler Motors Corporation, Highland Park, Mich.

[21] Appl. No.: 796,337

[22] Filed: Nov. 12, 1985

[51] Int. Cl.$^4$ .......................... G01L 7/16; G01L 19/14
[52] U.S. Cl. ......................................... 73/431; 73/744; 73/756; 200/82 R
[58] Field of Search ............. 73/431, 756, 83 R, 82 R, 73/741, 146.8, 744, 745

[56] References Cited

U.S. PATENT DOCUMENTS

| | | | |
|---|---|---|---|
| 2,558,743 | 7/1951 | Ford | 73/431 |
| 3,718,790 | 2/1973 | Zelenka | 200/83 R |
| 4,343,974 | 8/1982 | Hire et al. | 200/83 R |

Primary Examiner—Donald O. Woodiel
Attorney, Agent, or Firm—Kenneth H. MacLean, Jr.

[57] ABSTRACT

In a vehicle having an internal combustion engine, it is usual to monitor the oil pressure level of the engine's lubrication system to prevent damage to the engine in the event the oil pressure decreases to an unacceptable level. In this regard, a gauge or a warning light on the vehicle dashboard indicates when the oil pressure is low in response to a signal from an oil pressure level transducer which is fluidly connected to the engine lubrication system. Herein is an improved oil pressure transducer with interfitting housing portions connected together by means of a unique V-shaped fastening device of the snap-in type.

4 Claims, 5 Drawing Figures

TRANSDUCER FASTENING DEVICE

BACKGROUND OF THE INVENTION

Previous oil pressure transducers have utilized a two-part housing capturing a flexible diaphragm member therebetween. Typically, the diaphragm is movable in response to the pressure of the engine oil so as to operate warning switch means. The switch means are connected into a warning circuit so that when oil pressure falls below a desired minimum level, a warning light or the like is activated. The two-part housing is normally joined together with the aforementioned diaphragm therebetween by means of an edge rolled portion of one housing over the other housing in a mechanically deforming operation.

In addition to using an edge roll type of connection, retaining rings or annular members have been utilized to connect transducer housing portions together. This is also an effective means of joining the housings. However, in some applications, the radial space about the housings is quite limited and it is undesirable to utilize a retaining device which does not project outwardly from the housing. Accordingly, the present transducer incorporates annular split rings with portions which are expandable in the radial direction and interfit into housng grooves. Specifically, the present oil pressure transducer utilizes a retaining ring with a generally V-shaped cross sectional configuration. The V-shaped legs of the retainer cooperate with aligned circumferential grooves, one formed along the outer diameter surface of the inner housing and the other formed along an inner diameter surface of the outer housing. The V-shaped retainer may be conveniently inserted through a small radial space between housing members. This causes the legs of the "V" to flex inward toward one another as the fastener slips into the radial space between the housings. When the V-shaped retainer fully enters the radial space, the leg portions of the "V" expand radially to engage axially facing shoulder portions formed by the aforementioned channels. Thus, the housings and the V-shaped retainer is prevented from relative axial movement.

Previous oil pressure transducers have utilized a base housing portion including a threaded male end portion adapted to be received in a threaded aperture of the engine which fluidly communicates with the lubrication system of the engine. The prior transducers have utilized housing bases with relatively thick walls made by turning and cutting a solid metal cylinder on a screw machine or the like. This produces a relatively thick walled and heavy part. Obviously, another disadvantage of this type of housing is the high cost in machining the housing on the aforementioned screw machine. It has been found that a base housing can be easily formed without machining and with thin walls by cold forming. However, this type of housing lacks a relatively thick wall or a large diameter circumferential surface such as a hexagonal surface which can be utilized to rotate the transducer by a wrench or the like. The subject application describes a housing with a thin walled portion and with a desirable circumferential surface formed thereon defining a wrenching portion. The wrenching portion is formed by a molded elastomeric material or the like and has desirable wrenching surfaces formed thereon. The wrenching portion may be manufactured separately and subsequently joined to the housing by a press fit or by adhesives or the wrenching portion may be mold formed about the base housing.

Therefore, an object of the present invention is to provide an oil pressure transducer having two housing portions joined together with a diaphragm member secured therebetween, the housing portions being axially secured together by means of an annular retaining means which may be inserted into a small radial space between overlapping portions of the two housings and subsequently extends into circumferentially extending grooves in the housing portions.

Another object and feature of the subject transducer is the provision of two housing portions which are axially retained to each other by fastener means insertable between overlying and slightly spaced wall portions, the fastener being a V-shaped annular member with inner and outer leg portions, the leg portions of which are flexible radially inward as the fastener is inserted between the housings and which, subsequently, expand radially in the opposite direction into grooves formed in the housing portions so as to capture the housing portions in desired axial overlapping relationship to one another.

Other advantageous features of the subject transducer will be more readily apparent from a reading of the following Detailed Description of a Preferred Embodiment, reference being had to the accompanying drawings in which preferred embodiments are illustrated.

IN THE DRAWINGS

DETAILED DESCRIPTION OF A PREFERRED EMBODIMENT

Figure 1:
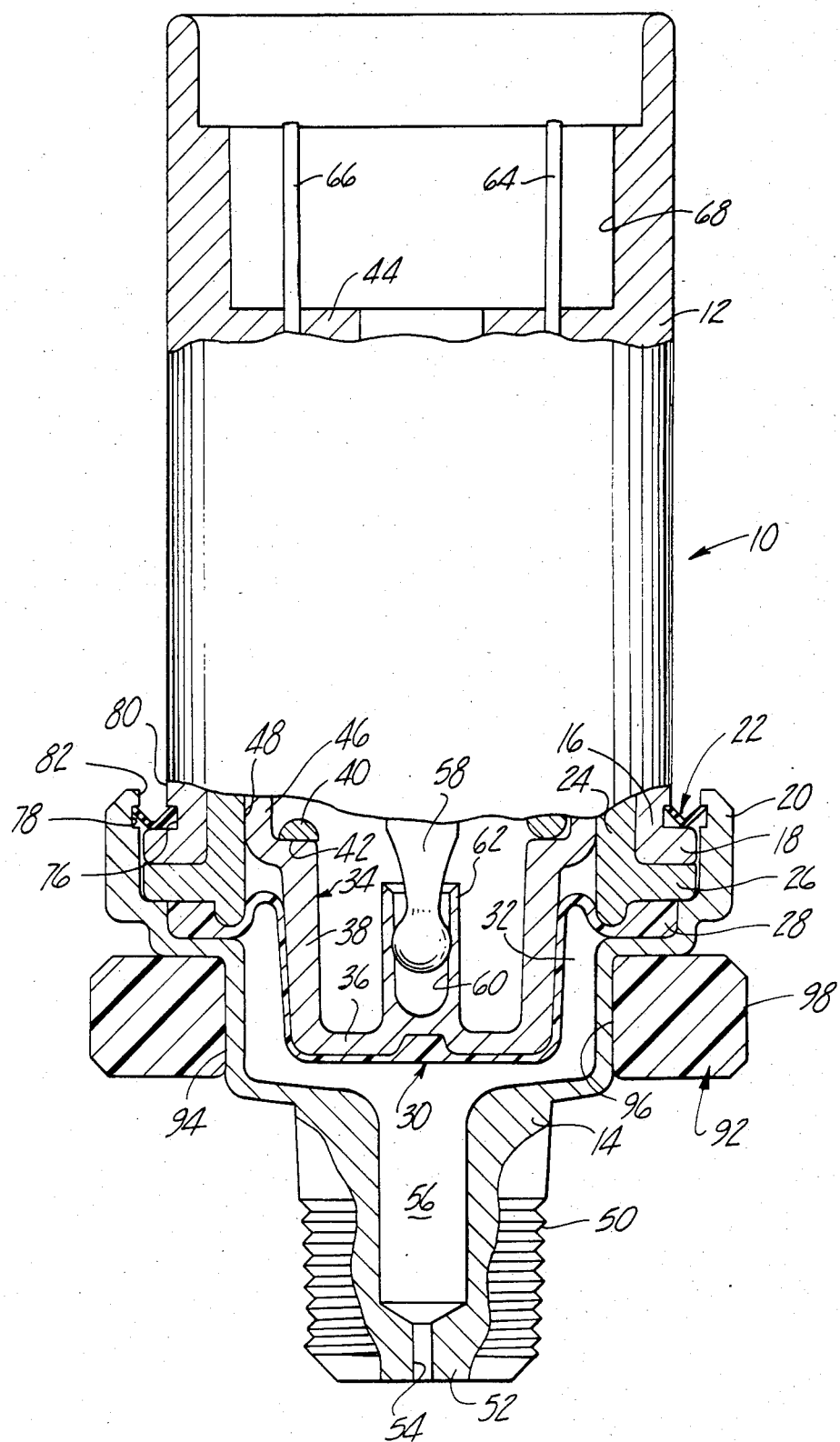
FIG. 1 is a partially sectioned and elevational view of the subject pressure transducer with portions broken away to reveal features discussed heretofore.

In FIG. 1, an oil pressure transducer 10 is illustrated. The pressure transducer 10 induces an upper housing portion 12 and a lower housing portion 14. The upper housing portion 12 has a lower end portion 16 terminating in a radially outwardly extending flange portion 18. The lower housing portion 14 includes an enlarged diameter upper end portion 20 which encircles the flange portion 18 of the upper housing. The housing portions 12 and 14 are telescoped together and established axially one to another by means of an annular retainer ring 22 to be described in more detail hereinafter.

The housings 12 and 14 cooperate together to retain a generally cylindrical sleeve member 24 or, more specifically, by contacting a radially outwardly extending flange portion 26. The flange portion 26 of sleeve 24 also engages an outer peripheral edge portion 28 of a resilient elastomeric diaphragm member 30 extending across the hollow midportion or space 32 of the transducer. The diaphragm 30 has sufficient surface to overlie or cover a substantial portion of a generally cup-shaped end of a piston member 34. Specifically, the end portion 36 of the piston 34 and a substantial portion of the lower side wall 38 of piston 34 are contacted by the central portions of the resilient diaphragm 30. The piston 34 is biased downward toward the lower housing 14 by a coil type spring 40 which rests against a shoulder portion 42 of the piston 34. The upper end of the coil spring (not visible) rests against a recessed wall portion 44 of the upper housing 12. An upper cylindrical side wall 46 of the piston 324 slidably engages the inner cylindrical surface 48 of member 24.

The lower housing or base 14 is provided with thread means 50 on an end portion 52 adapted for threadably joining with a similarly threaded aperture of an engine to mount the transducer. An oil inlet passage 54 is formed in the threaded end 52 for communication with the engine oil lubrication system. Passage 54 in turn communicates with the interior space 56 formed by the base 14 and the diaphragm 30. Pressurized oil from passage 54 generates a force on the diaphragm 30 and, hence, on piston 34 against spring 40. This force tends to move piston 34 upward in FIG. 1 to a position proportional to the oil pressure.

The transducer includes an axially movable central stem and switch activating portion 58 relative to sleeve 24 and housing 12. The lower end of portion 58 is retained within a bore 60 of an upwardly extending tower portion 62 of the piston 34. When the piston 34 moves upward, the portion 58 is also moved therewith to produce the aforedefined switching functions. In this regard, electrical terminals 64 and 66 are shown within a recess 68 at the upper end of housing 12. The terminals 64 and 66 are adapted to be connected to an oil pressure warning circuit of the vehicle.

As previously stated, the housing portions 12 and 14 are secured together by means of an annularly shaped retainer 22. The retainer shown in FIG. 1 is better illustrated in FIG. 2. The cross sectional view shows a generally V-shaped configuration with a lower central portion 70, an inner leg portion 72 and an outer leg portion 74. The leg portions 72 and 74 are resiliently connected together at the midportion 70 so that the leg portions may flex inwardly and outwardly to a desired extent. Referring to FIG. 1, the upper housing 12 includes an undercut portion or channel 76 circumferentially extending in its outer surface adjacent the flange portion 18. Likewise, a similar channel 78 is formed on the inside diameter portion of the end 20 of the base 14. The channels 76 and 78 are axially aligned when the upper and lower housings 12 and 14 are fitted in desired axial position. When the housings are placed in this position, the annularly shaped retainer 22 can be easily inserted in the slight radial space between surfaces 80 and 82 of the housings 12 and 14, respectively. During insertion of the retainer 22, the inner and outer diameter legs 72 and 74, respectively, are flexed toward one another caused by the close spacing between surfaces 80 and 82. When the midportion 70 of the retainer approaches flange 18, the legs 72 and 74 then expand radially away from one another into the channels 76 and 78, respectively. Henceforth, retainer 22 axially secures the housing portions 12 and 14. As a result, non-destructive removal of the retainer 22 is very difficult if not impossible.

Figure 2:
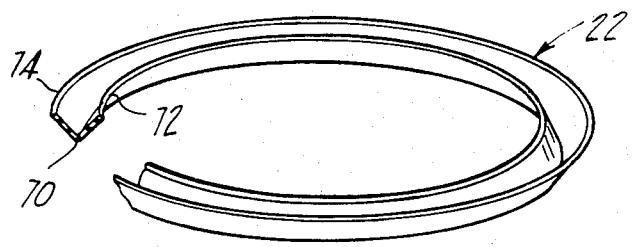
FIG. 2 is a perspective view of a V-shaped retaining member shown in FIG. 1.
Figure 3:
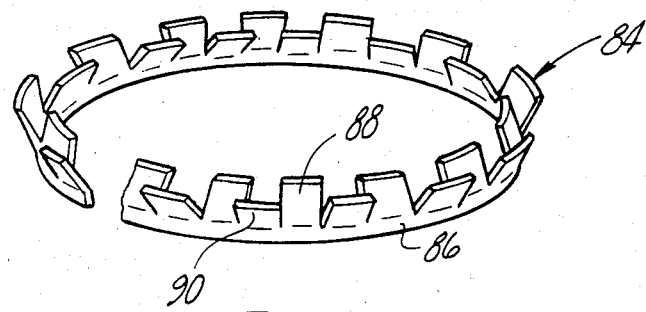
FIG. 3 is a perspective view of a modified V-shaped retainer member like the retainer member shown in FIG. 2.

In FIG. 3, a modified retainer 84 is illustrated which may be used in place of retainer 22 shown in FIGS. 1 and 2. Retainer 84 is formed from a ring or band of material 86 which preferably is of metal. Alternately inwardly and outwardly projecting leg portions 88 and 90 are formed from the upper edge portion of band 86 by a series of axially extending cuts or separations of the material. The cuts extend a substantial portion of the width of the band 86 leaving a relatively small uncut lower portion which joins the legs 88 and 90. The retainer 84 functions exactly as the retainer 22 to secure the housings with its inner and outer leg portions 88 and 90 being flexed toward one another when the retainer 84 is inserted between the surfaces 80 and 82. Likewise, the leg portions 88 and 90 expand away from one another when the lower edge of retainer 84 approaches the upper surface of the flange 18.

Figure 4:
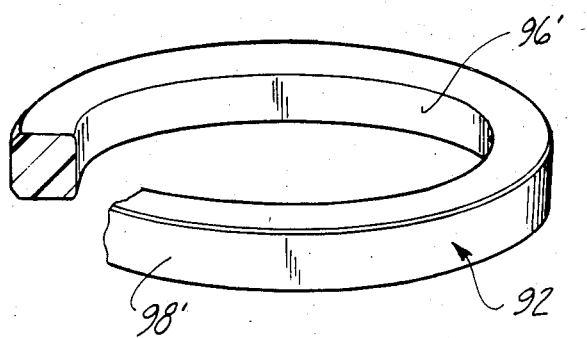
FIG. 4 is a perspective view of an annular member which forms the wrenching portion shown in FIG. 1.
Figure 5:
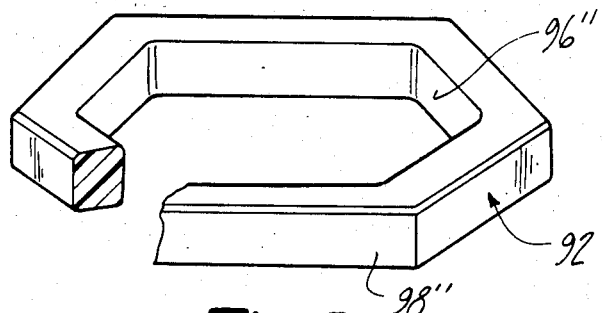
FIG. 5 is a perspective view of a modified wrenching member which is similar to the member shown in FIG. 4.

As previously stated, the transducer is mounted on the vehicle engine by rotating the base portion 14 and the threaded end portion 52 thereof to join a similarly threaded aperture of the engine. Because the thin walls of the housing 12 and 14 are easily crushed or damaged, it is undesirable to apply a rotating tool or wrench to the outer surface thereof. Therefore, the transducer has wrenching portion 92 encircling the base portion 14. Specifically, the wrenching portion 94 may be separately mold formed or extrusion formed of plastic or elastomeric material and placed in encircling relation to the circumferential surface 94 of the lower housing 14. The wrenching portion 92 may also be formed of sintered powder metal material if desired which is molded right around the housing portion 14 or formed separately. In FIGS. 4 and 5, two embodiments of wrenching portion 92 are shown. In FIG. 4, the wrenching portion displays an inner cylindrical surface 96', and in FIG. 5, the inner surface displays a hexagonal surface 96". Likewise, in FIG. 4 the wrenching portion displays a generally cylindrical outer surface 98', and in FIG. 5, the outer surface 98" displays a hexagonal surface adapted to be readably engaged by a wrench type of tool.

In either configurations shown in FIGS. 4 and 5, the wrenching portion 92 is formed of relatively inexpensive material which is easily formed by known means such as molding, extrusion or sintering. The wrenching portion 92 is secured about the lower housing or base portion 14 by either a press fit, heat shrinking the member thereon or by utilization of some fastener such as various adhesives. The use of a diverse wrenching portion permits damaging the relatively thin walled housing, particularly in the vicinity of the wrenching member 92 in FIG. 1. This permits the use of various manufacturing techniques for forming the thin walled base 14, including cold forming, spinning or similar low cost forming operations as opposed to metal cutting by the use of a screw machine or the like which is a relatively expensive manufacturing operation and produces relatively thick walls. These manufacturing operations are known in the art.

Although only relatively few modifications and embodiments of the transducer have been discussed, other modifications will be readily apparent to one skilled in the art which still fall within the scope of the following claims which described the invention.

What is claimed is:

1. A pressure transducer having first and second housings connected together by an annularly shaped fastener means comprising:

a generally tubular first housing having a substantially cylindrical end portion with a radially outwardly extending edge flange adjacent thereto;

a generally tubular second housing having a substantially cylindrical end portion of greater diameter than the diameter of the edge flange of the first housing, the end portion of the second housing encircling the edge flange and the end cylindrical portion of the second housing encircling the edge flange and the end cylindrical portion of the first housing when the housings are assembled together in a telescopically arranged condition, whereby an open channel means extends between the cylindrical portion of the first housing and the encircling end portion of the second housing;

first groove means extending circumferentially in the outer surface of the first housing adjacent the edge flange thereof;

second groove means extending circumferentially in the inner surface of the end portion of the second housing, whereby the first and second groove means are axially aligned with respect to one another when the housings are arranged in the telescopically assembled condition;

an annularly configured fastener means with a generally V-shaped cross section characterized by radially outwardly and inwardly projecting leg portions which extend from a common central portion, the fastener means being of resilient but stiff material to permit the inner and outer leg portions to distortingly flex toward one another when the fastener means passes into the channel means formed between the first and second housings and whereby the leg portions move toward their predistorted configuration into the groove means as the common central portion moves into close relationship with the flange of the first housing whereas the fastener means is wholly within the space defined by the first and second channel means.

2. The pressure transducer set forth in claim 1 in which the V-shaped annular fastener member is formed by distinct radially inwardly directed and radially outwardly directed leg portions integrally joined together at the common central portion.

3. The pressure transducer set forth in claim 2 in which the inward and outward leg portions alternate about the periphery of the annularly shaped fastener.

4. The pressure transducer set forth in claim 2 in which the fastener means is of flexible but tough metal material to maintain flexure of the leg portions within the elastic-range of the material.

* * * * *